United States Patent [19]

Siegenthaler

[11] Patent Number: 5,207,849
[45] Date of Patent: May 4, 1993

[54] METHOD AND DEVICE FOR STITCHING MULTILAYER PRODUCTS OF GREEN ELASTOMERIC MATERIAL

[75] Inventor: Karl J. Siegenthaler, Ostia, Italy

[73] Assignee: Bridgestone/Firestone, Inc., Akron, Ohio

[21] Appl. No.: 832,185

[22] Filed: Feb. 6, 1992

[30] Foreign Application Priority Data

Mar. 26, 1991 [IT] Italy .............................. 000211 A/91

[51] Int. Cl.$^5$ ...................... B29C 30/14; B29C 30/28
[52] U.S. Cl. .................. 156/130.3; 156/413; 156/421; 156/411; 264/310; 264/326; 425/32; 425/35
[58] Field of Search .................. 264/326, 310; 425/35, 425/38, 44, 32; 156/421, 411, 130.3, 408, 413, 412, 409

[56] References Cited

U.S. PATENT DOCUMENTS

| | | |
|---|---|---|
| 2,717,022 | 9/1955 | Duerksen . |
| 2,808,872 | 10/1957 | Clapp . |
| 3,423,272 | 1/1969 | Sornsen .............................. 156/421 |
| 3,819,449 | 6/1974 | Caretta ............................ 156/130.3 |
| 4,262,624 | 4/1981 | Soeda et al. . |
| 4,276,105 | 6/1981 | Gessaga .......................... 156/130.3 |
| 4,306,931 | 12/1981 | Klose ................................. 156/421 |
| 4,398,492 | 8/1983 | Casey . |

FOREIGN PATENT DOCUMENTS 45-28499  9/1970  Japan .

*Primary Examiner*—Jan H. Silbaugh
*Assistant Examiner*—Mathieu Vargot
*Attorney, Agent, or Firm*—David A. Thomas

[57] ABSTRACT

A method and device (1) for stitching multilayer products (2) of green elastomeric material, whereby an annular multilayer product (2) of green elastomeric material, particularly a product forming at least components of a tire (2), is placed inside a hollow annular body designed to house the multilayer product (2) and forming a stitching mold (5) having a concave inner surface (5a) contacting a first convex surface (34a) of the multilayer product (2) and negatively reproducing the final shape to be imparted on the multilayer product (2); a stitching device (24) being brought into contact, at a given pressure, with a second concave surface (34) of the multilayer product (2); and relative motion being produced between the stitching device (24) and the multilayer product (2), so as to cause the stitching device (24) to stitch the multilayer product (2) in contact with the inner surface (5a) of the stitching mold (5).

9 Claims, 7 Drawing Sheets

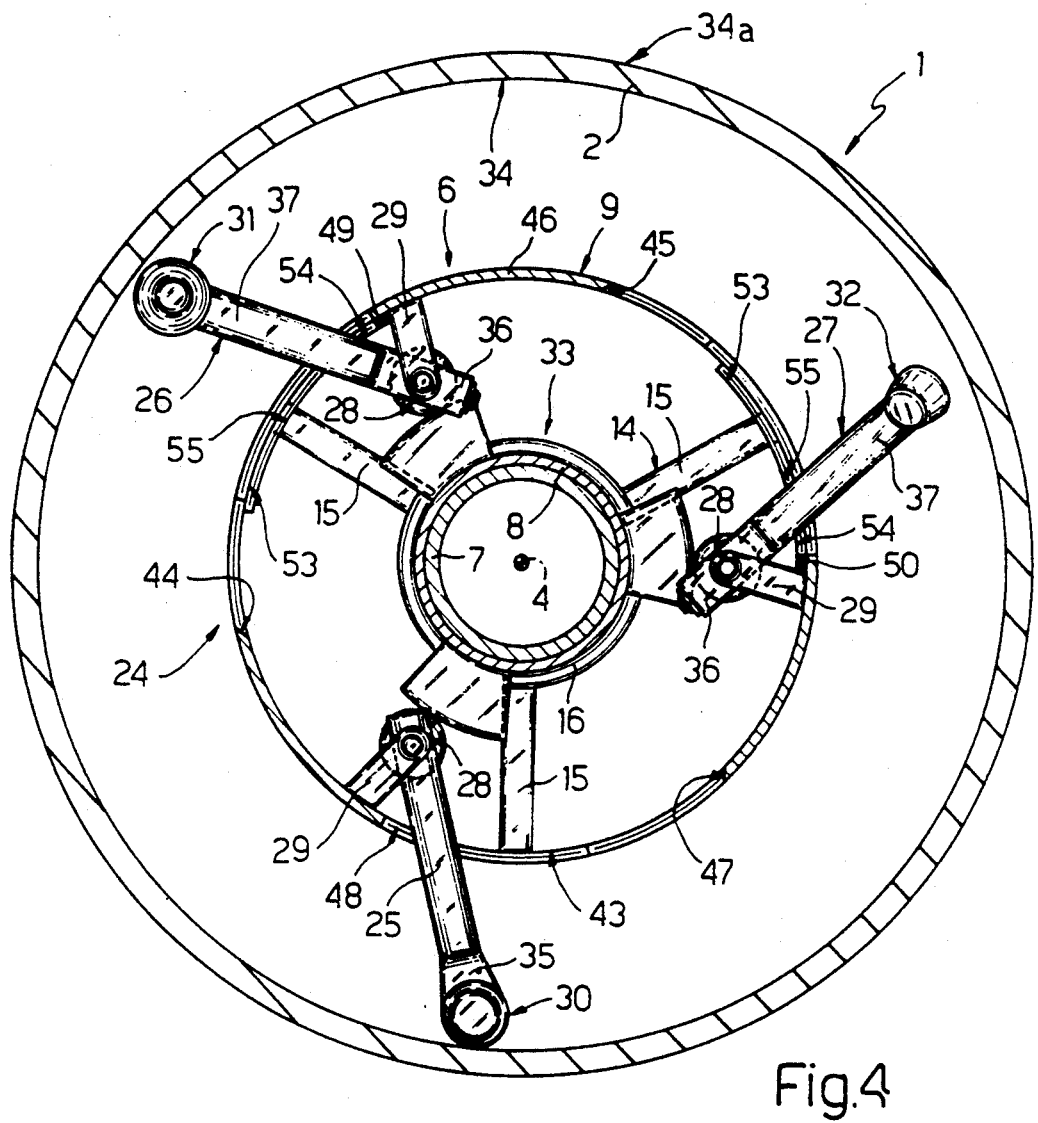
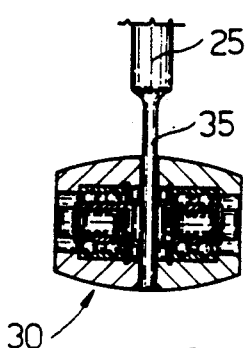
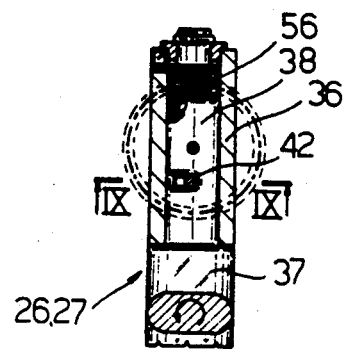
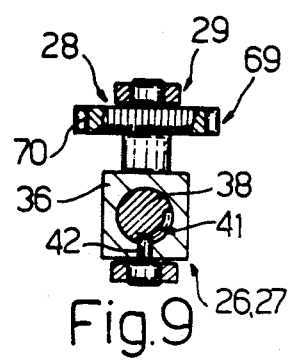
Fig.4
Fig.7  Fig.8  Fig.9

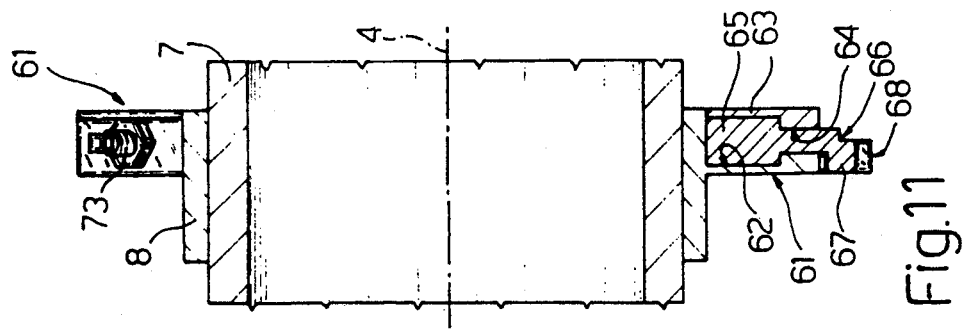
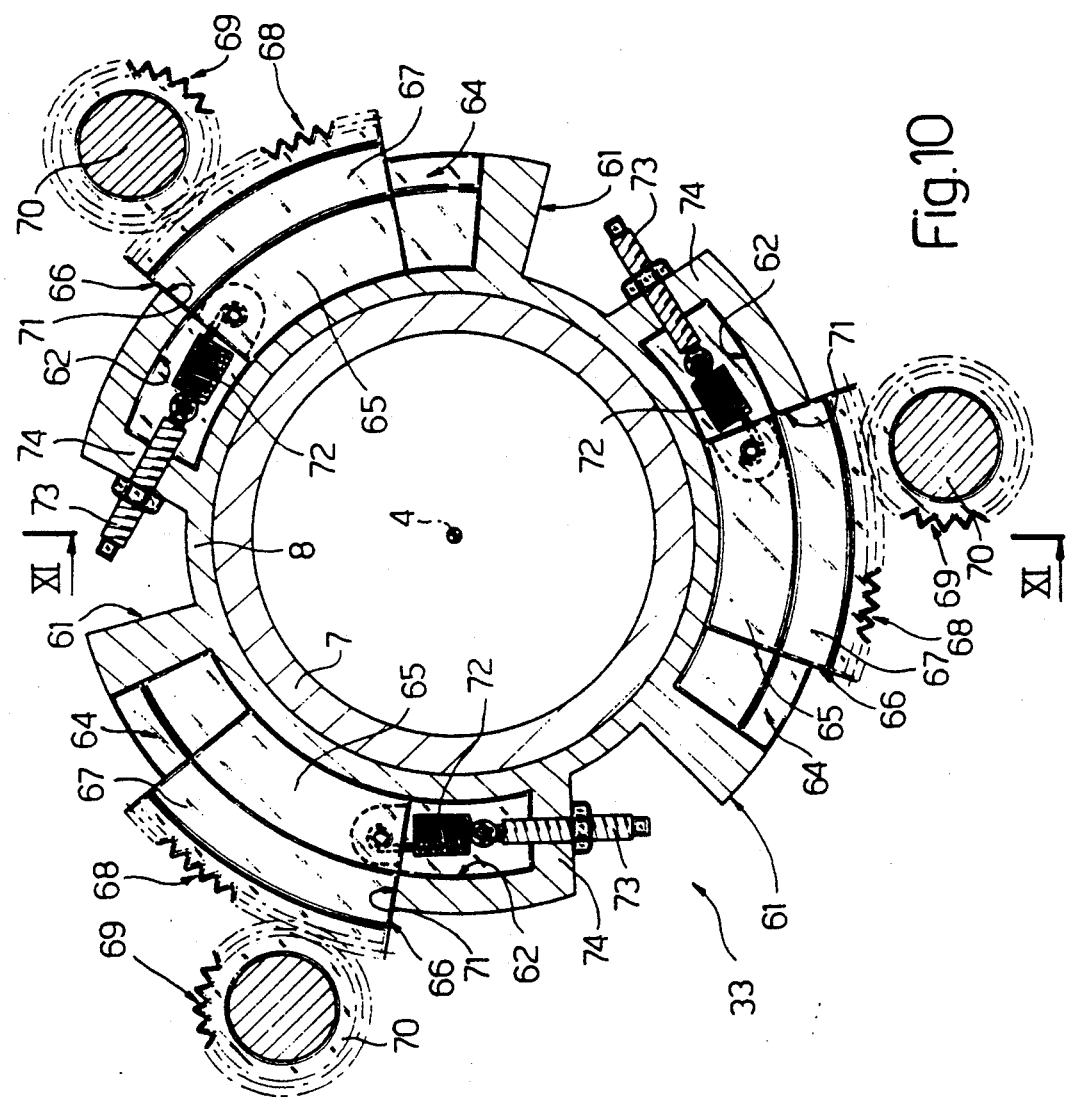

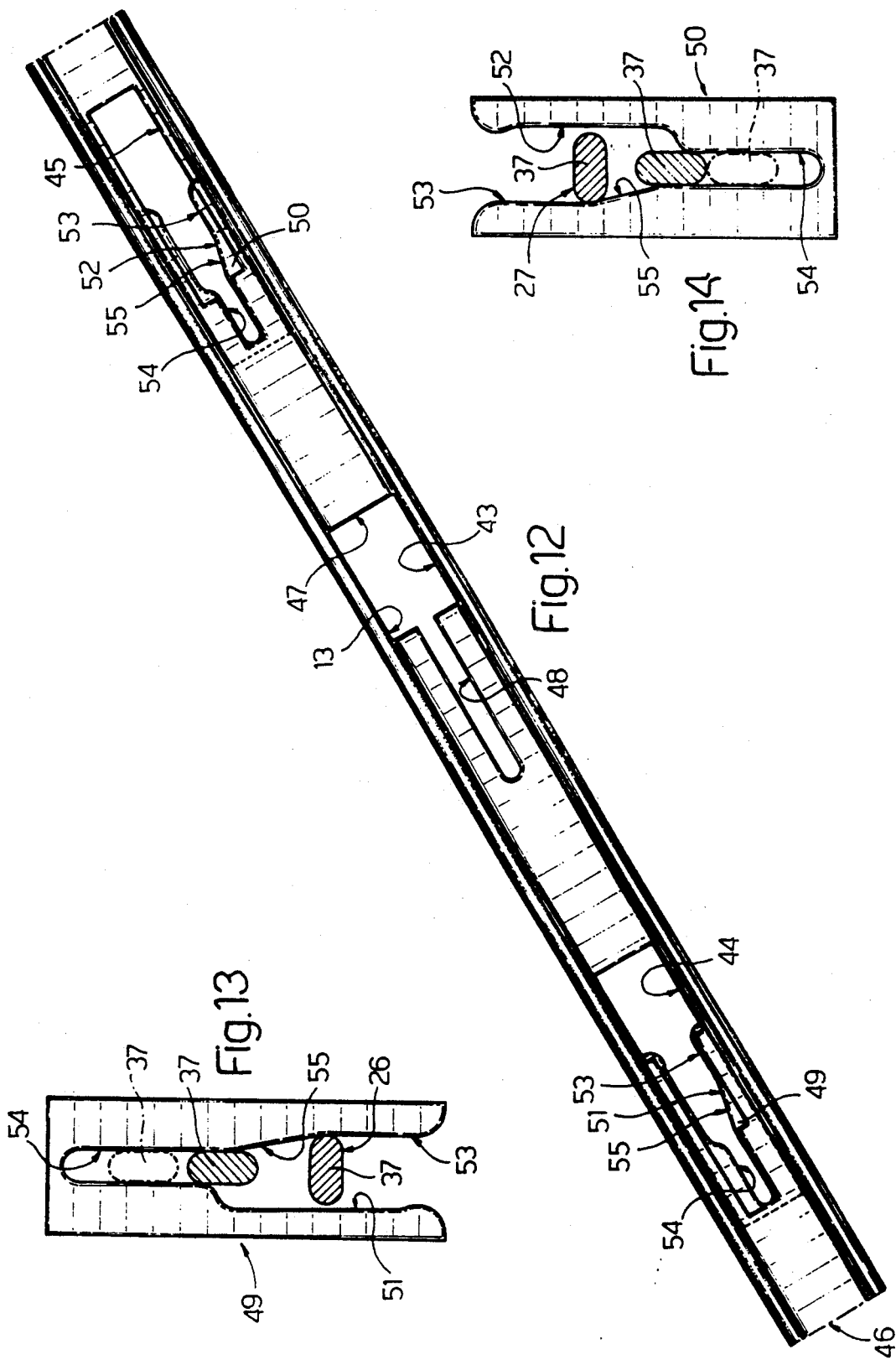

METHOD AND DEVICE FOR STITCHING MULTILAYER PRODUCTS OF GREEN ELASTOMERIC MATERIAL

TECHNICAL FIELD

The present invention relates to a method and a device for stitching multilayer products of green elastomeric material. The present invention may be employed to advantage, among other things, for producing road vehicle tires and/or tire components to which the following description refers purely by way of example.

BACKGROUND OF THE ART

Road vehicle tires are usually produced by superimposing a number of layers of elastomeric material defining at least two multilayer annular products, respectively consisting of an inner carcass and an outer tread belt.

The outer tread belt includes an outer tread band surrounding a reinforcing belt having at least one tread ply, while the inner carcass usually has a substantially U-shaped section, and includes an annular layer defined by a body ply and by an innerliner covering a part of the inner surface of the body ply, the remaining inner surface of which is covered by two abrasion strips and two sidewalls on opposite sides of the innerliner. The carcass also includes two beads, each housed inside a respective lateral wall of the carcass formed by turning a respective lateral end of the annular layer up and about or around the bead.

For achieving maximum uniformity of the tire, the above two multilayer intermediate products and, especially, those produced by combining the same, i.e. the finished or assembled green tires, are generally compacted by means of a stitching operation.

The following description deals solely, though without departing from the wider scope of the present invention, with the stitching together of said two multilayer intermediate products for producing a finished green tire, no mention being made of any intermediate stitching for compacting each of said two multilayer intermediate products, to which the same considerations also apply.

For producing a finished green tire, the outer tread belt is normally stitched onto the inner carcass from the outside. In order to withstand this stitching process the green tire must be connected in a fluid-tight manner to an inner support and be properly inflated. Moreover, to enable it to be stitched from the outside, the outer surface of the green tire must be freely accessible. External stitching is usually performed by rotating the green tire in contact with a stationary stitching device as a result of which a given, usually radial, pressure is applied onto the tire.

A major drawback of external stitching is that, due to the freedom of movement of the outer surface of the green tire, any distortion of the tire caused by the radial pressure applied by the stationary stitching device is totally uncontrollable, and may easily result in displacement of the cords in the body plies and/or tread plies, thus seriously impairing the uniformity of the tire. Moreover, when applied externally, said radial pressure may result in failure of the joining or adhesion of the innerliner relative to the carcass.

SUMMARY OF THE INVENTION

It is an object of the present invention to provide a stitching method designed to overcome the aforementioned drawbacks. According to the present invention, there is provided a method of stitching multilayer products of green elastomeric material, particularly those forming at least components of a green tire, characterized by the fact that it includes the steps of placing an annular multilayer product of elastomeric material inside a hollow annular body designed to house said multilayer product and forming a stitching mold having a concave inner surface contacting a first convex surface of said multilayer product, said inner surface negatively matching the shape to be imparted on said multilayer product; bringing stitching means into contact, at a given pressure, with a second concave surface of said multilayer product; and producing relative motion of said stitching means and said multilayer product, so as to cause said stitching means to stitch said multilayer product in contact with said inner surface of said stitching mold.

The present invention also relates to a unit or apparatus for implementing the noted method. According to the present invention, there is provided a unit for stitching multilayer products of green elastomeric material, particularly those forming at least components of a green tire, characterized by the fact that it comprises a hollow annular body forming a stitching mold for an annular multilayer product of elastomeric material and having a concave inner surface negatively matching a first convex surface of said multilayer product; stitching means housed inside said inner surface and moving to and from an operating position contacting a second concave surface of said multilayer product; and actuating means for producing relative motion of said stitching means and said multilayer product, so as to cause said stitching means to stitch said multilayer product in contact with said inner surface of said stitching mold.

BRIEF DESCRIPTION OF THE DRAWINGS

A number of non-limiting embodiments of the present invention will be described by way of example with reference to the accompanying drawings, in which:

FIGS.3 and 4 show sections taken along line III—III in FIG.1, with parts removed for simplicity, of the FIG. 1 unit in two different operating positions;

FIGS.5, 6, 7 and 8 show larger-scale, partially sectioned views of respective details of FIGS.3 and 4;

FIG.9 shows a section taken along line IX—IX in FIG.8;

FIG.10 shows a larger-scale section of a further detail of FIGS.3 and 4;

FIG.11 shows a section taken along line XI—XI of FIG.10;

FIG.12 shows a plan view of a further detail of FIGS.3 and 4;

FIGS.13 and 14 show larger-scale views of respective details of FIG.12 at different operating steps or stages.

BEST MODE FOR CARRYING OUT THE INVENTION

Figure 1:
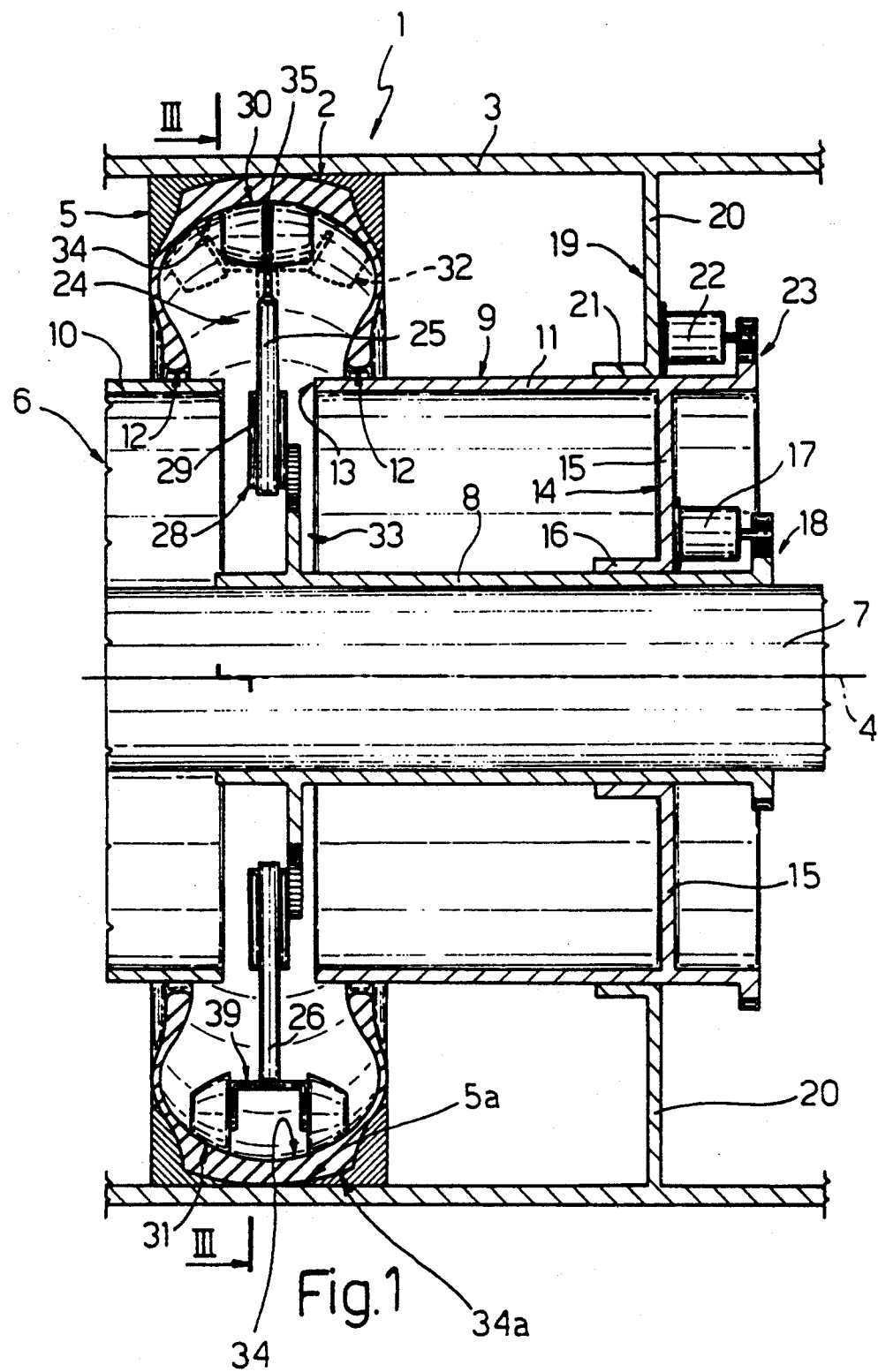
FIG.1 shows a schematic axial cross section of a first preferred embodiment of a stitching unit in accordance with the present invention.

Number 1 in FIG.1 indicates a unit or apparatus for internally stitching a green tire 2. Unit 1 comprises a tubular outer body 3 coaxial with axis 4 of tire 2 and fitted, on its inner surface, with a toroidal building mold 5 open along its inner edge and designed to house tire 2. In shape, the inner surface of mold 5 is substantially a negative reproduction of a finished smooth-tread tire obtainable by curing green tire 2.

Unit 1 also comprises an inner drum 6 in turn comprising a central hollow shaft 7 coaxial with axis 4 and fitted with a coupling 8; and a tubular body 9 coaxial with shaft 7 and fitted to the outside of coupling 8. Tubular body 9 is defined by two coaxial tubular elements 10 and 11 preferably, but not necessarily, angularly integral with each other (as explained in detail later). Elements 10 and 11 are arranged facing a respective bead portion 12 of tire 2, and defined there between an annular opening 13 located centrally, in use, between opposed bead portions 12 of tire 2 housed inside mold 5.

Tubular body 9 of unit in FIG.1 is supported for rotation on coupling 8 by means of a frame 14 having a number of radial brackets 15 (only two of which are shown in FIG.1), each having one end connected integrally with the inner surface of tubular body 9, and the opposite end integral with the outer surface of a collar 16, the inner surface of the latter being connected for rotation to the outer surface of coupling 8. One of brackets 15 supports a motor 17, the output shaft of which is connected to coupling 8 by means of a pinion-ring gear joint 18.

As shown in FIG.1, tubular body 3 is supported for rotation on drum 6 by means of a frame 19 having a number of radial brackets 20, each having one end connected integrally with the inner surface of tubular body 3, and the opposite end integrally with the outer surface of a collar 21, the inner surface of the latter being connected for rotation to the outer surface of tubular body 9. One of brackets 20 supports a motor 22, the output shaft of which is connected to tubular body 9 by means of a pinion-ring gear joint 23.

Figure 3:
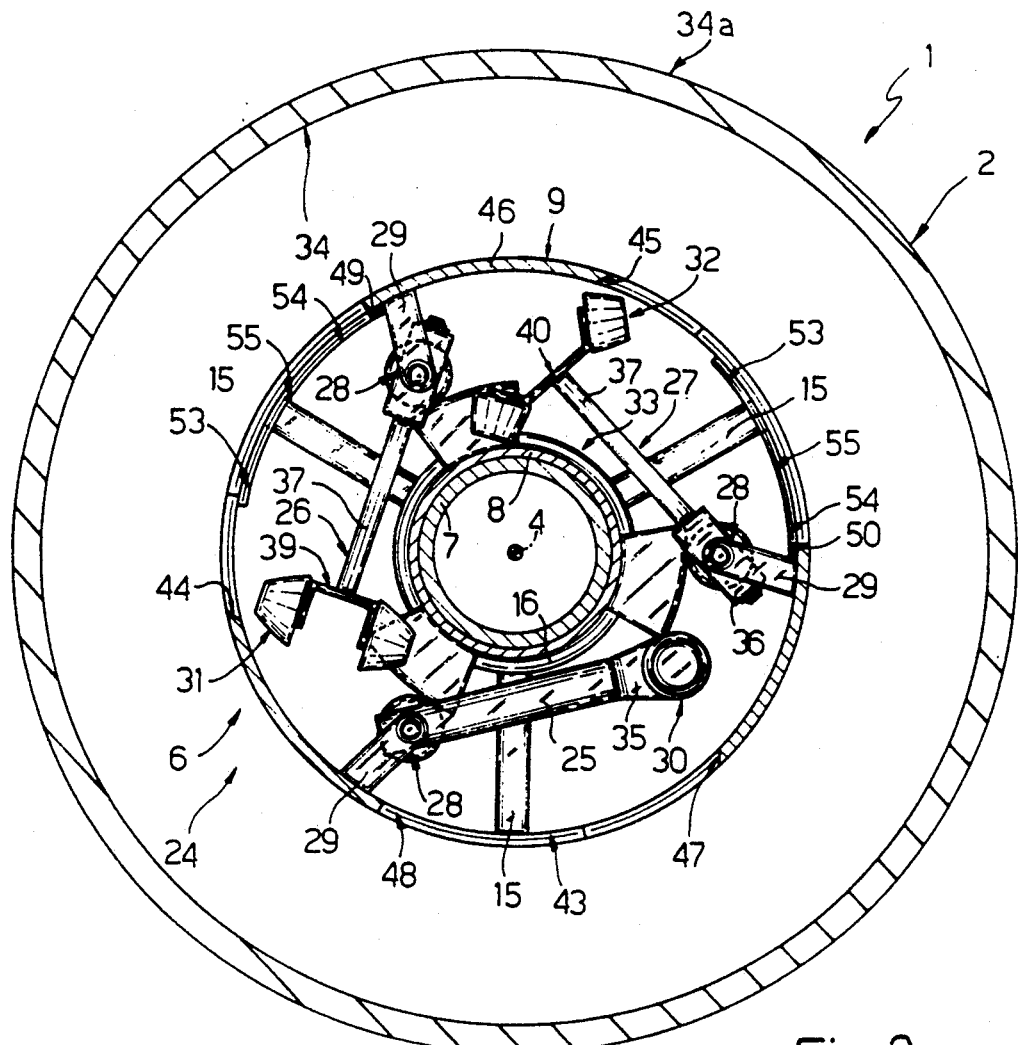

As shown in FIGS.3 and 4, the outer surface of coupling 8 is fitted with a stitching device or apparatus including, in the example shown, three arms 25, 26 and 27, each hinged at one end, by means of hinge 28, to a respective fork 29 integral with the inner surface of drum 6 and extending towards coupling 8. Stitching device 24 also includes three pairs of conical rollers 30, 31 and 32 connected for rotation to the free ends of respective arms 25, 26 and 27; and a control device 33 (FIGS.10 and 11) for rotating arms 25, 26 and 27, in relation to drum 6 and about respective hinges 28, between a withdrawn idle or rest position (FIG.3) wherein pairs of rollers 30, 31 and 32 are located inside tubular body 9 at a distance, from axis 4, of less than the inside radius of tire 2, and an extracted or extended operating or work position as shown in FIG.4.

In the extracted operating position, arms 25, 26 and 27 extend outwardly of tubular body 9 through opening 13, and pairs of rollers 30, 31 and 32 engage the inner surface 34 (FIG.2) of tire 2, with the latter presenting a convex outer surface 34a contacting the concave inner surface 5a of mold 5. Tire 2 is mounted with bead portions 12 facing the outer surface of respective tubular elements 10 and 11.

As shown in FIGS.3 and 4, and particularly in FIG.7, rollers 30 are located coaxially on opposite sides of an end portion 35 of arm 25, with their wider ends facing each other. For reasons to be explained later, rollers 30 can be maintained with their common axis parallel to axis 4 throughout displacement of arm 25 between said idle and operating positions, whereas rollers 31 and 32 must be rotated approximately 90° about the axes of respective arms 26 and 27 as these move between said idle and operating positions.

As shown in FIGS.3 and 4, arm 25 is formed in one substantially rectangular-section piece, the larger lateral surfaces of which are flat, and the smaller lateral surfaces of which are rounded. Each of arms 26 and 27, on the other hand, comprises a tubular element 36 hinged to respective fork 29, and a rod 37 of substantially the same shape as arm 25.

Figure 5:
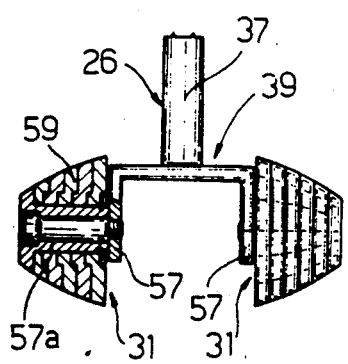
Figure 6:
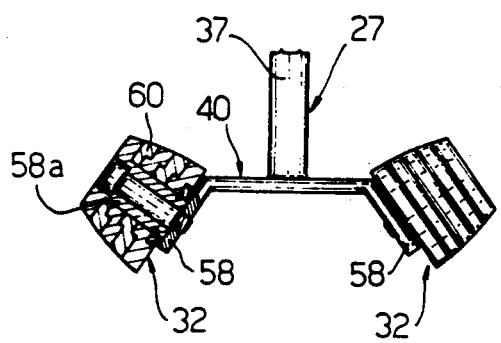

As shown in FIG.8, on the end facing respective tubular element 36, each rod 37 is fitted integral with a pin 38 engaged for rotation inside an axial hole on tubular element 36. On the ends opposite those fitted with respective pins 38, rods 37 of arms 26 and 27 are also fitted with respective forks 39 and 40, as best seen in FIGS.5 and 6, respectively.

As shown in FIGS.8 and 9, each pin 38 includes an intermediate circumferential groove 41 extending over an arc of 90° about pin 38 and engaged in a sliding manner by an end portion of a radial pin 42 extending through tubular element 36.

As they move from the idle to the extracted operating position, pairs of rollers 30, 31 and 32 project from tubular body 9 through respective openings 43, 44 and 45 (FIGS.12 to 14) formed through a cylindrical annular element 46 supported by tubular elements 10 and 11, not necessarily secured angularly to each other, so as to close groove 13. Opening 43, enabling the passage of conical rollers 30, is substantially T-shaped, and includes a wide portion 47, the width of which, measured parallel to axis 4, is at least equal to the total axial length of the pair of rollers 30; and a narrow portion 48, the width of which is substantially equal to the distance between the two larger faces of arm 25, and which provides for laterally supporting arm 25 in the extracted operating position.

At openings 44 and 45, annular element 46 is fitted with two plates 49 and 50 defining, at openings 44 and 45, respective cam openings 51 and 52, each comprising, as shown particularly in FIGS.13 and 14, a wide inlet portion 53 at least as wide as the distance between the two smaller rounded faces of respective rod 37, and a narrow end portion 54 substantially equal in width to the distance between the larger lateral faces of respective rod 37. Said two portions 53 and 54 are blended on one side by an inclined cam surface 55 which, as respective rod 37 moves from the idle to the extracted operating position, and after respective pairs of rollers 31 and 32, originally perpendicular to axis 4 (FIG.3), have moved through respective openings 44 and 45, engages a smaller lateral surface of respective rod 37, as it travels along wide portion 53 of respective opening 51, 52 transversely in relation to its larger lateral surfaces. On engaging respective inclined surface 55, each rod 37 rotates 90° about its axis in relation to respective tubular element 36, and against the action of a torsion spring 56 (FIG.8) between each tubular element 36 and respective pin 38, so as to engage narrow portions 54 of respective openings 51, 52.

As shown in FIG.5, fork 39 includes two arms 57 parallel to rod 37, each fitted with a respective pin 57a supporting for rotation a respective roller 31 extending outwardly from fork 39, perpendicular to respective arm 57, and having its larger side adjacent to arm 57.

As shown in FIG.6, fork 40 comprises two arms 58 diverging in relation to each other and to the axis of respective rod 37, and each fitted with a respective pin 58a supporting for rotation a respective roller 32 extending outwardly from fork 40, perpendicular to respective arm 58, and having its larger side adjacent to arm 58. Rollers 31 and 32 are defined respectively by a number of stacked plates 59 and 60 connected together in an axially-fixed manner and so as to rotate in relation to one another about respective pins 57a and 58a.

Figure 2:
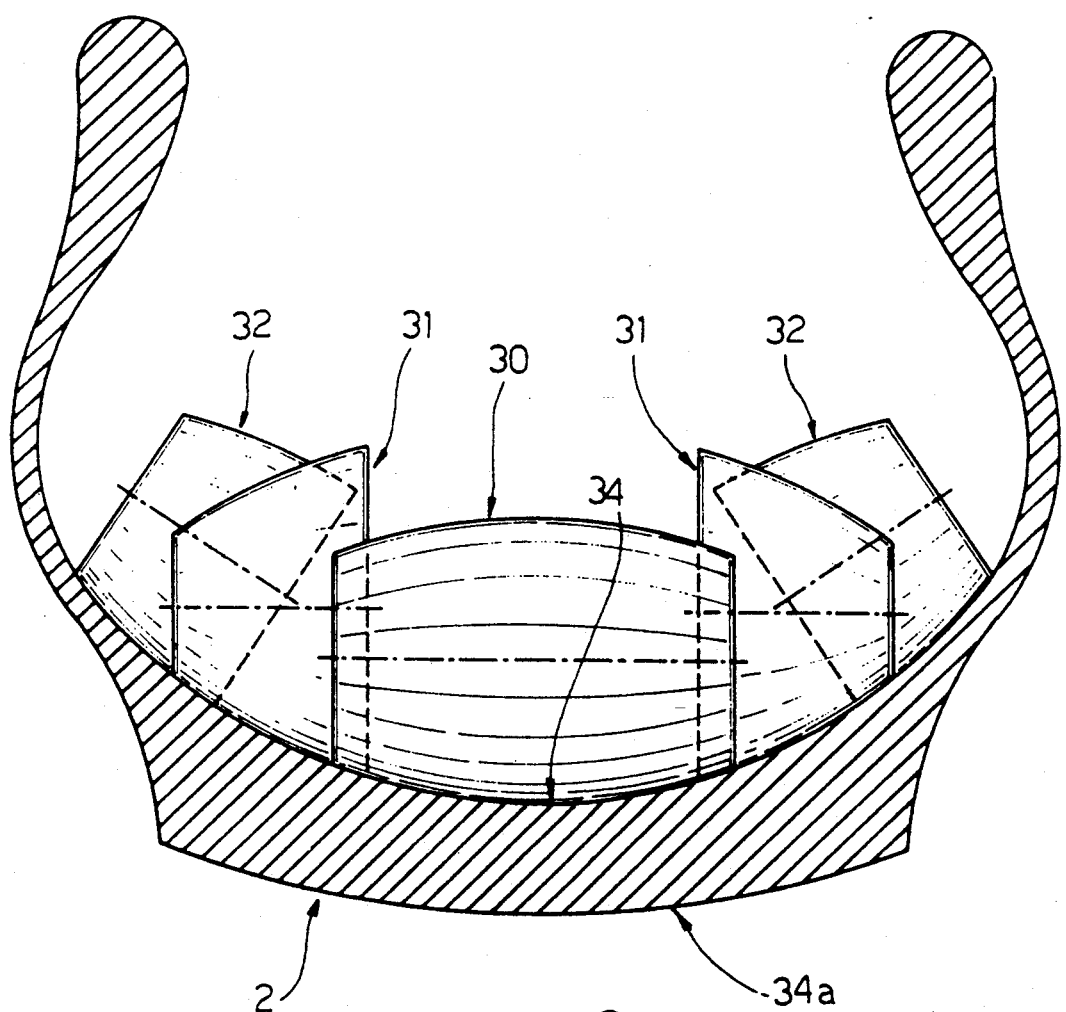
FIG.2 shows a larger-scale view of a detail of FIG.1.

As shown in FIG.2, (when arms 25, 26 and 27 are in the extracted operating position), pairs of rollers 30, 31 and 32 are arranged in contact with inner surface 34 of tire 2, each one of rollers 31 rolling in contact with an annular strip of surface 34 located between an annular rolling strip of respective roller 30 and an annular rolling strip of respective roller 32. As shown also in FIG.2, each of said three rolling strips overlaps the adjacent strip so as to define a continuous annular rolling or stitching surface extending over the entire central portion of tire inner surface 34.

As shown in FIGS.10 and 11, control device 33 includes three equally spaced radial appendices 61 connected integrally with the outer surface of coupling 8 and each having a circumferential groove 62 closed by an annular body 63 (FIG.11) facing groove 62, so as to define, with an end portion of appendix 61, a radial opening 64 enabling external communication with groove 62. Each groove 62 defines a slideway for a respective slide 65 forming a first portion of a circular-sector-shaped element 66 also forming part of device 33 and having a second portion 67 extending radially outwardly from appendix 61 through opening 64 and having peripheral outer teeth 68. Teeth 68 mesh with teeth 69 of respective gears 70, each located inside respective fork 29 (FIG.9) and fitted onto a respective arm 25, 26, 27.

As shown in FIG.10, (when arms 25, 26 and 27 are in the withdrawn idle position), each element 66 is held against a circumferential end surface 71 of opening 64 by a spring 72 housed inside groove 62 and having one end connected to element 66, and the opposite end connected to the end of a threaded pin 73 fitted in axially-adjustable manner through radial end wall 74 of appendix 61.

Commencing with arms 25, 26 and 27 in the withdrawn idle position, when motor 17 (FIG.1) is activated, coupling 8 rotates counterclockwise, thus rotating arms 25, 26 and 27 clockwise about respective hinges 28, so as to move rollers 30, 31 and 32 outwardly from drum 6 through respective openings 43, 44 and 45 (FIG.3). At this point, by rotating coupling 8 further, rollers 30 continue moving towards inner surface 34 of tire 2, still rotating solely about respective hinge 28, and arm 25 engages portion 48 (FIGS.3, 4 and 12) of opening 43. In addition to rotating about respective hinges 28, rollers 31 and 32 are rotated 90 counterclockwise about the axis of respective arms 26 and 27, subsequent to rods 37 contacting respective cam surfaces 55 (FIGS.3, 4 and 12) of plates 49 and 50, against the action of respective torsion springs 56. Further rotation of coupling 8 engages rods 37 with respective portions 54 of openings 51 and 52, and presses rollers 30, 31 and 32 onto inner surface 34 of tire 2, the contact pressure of which is adjustable by regulating the preload on respective springs 72 by axially adjusting respective threaded pins 73. Once the required contact pressure is achieved, and subsequent to further rotation of coupling 8, arms 25, 26 and 27 remain in a substantially fixed angular position in relation to drum 6, by virtue of elements 66 sliding inside respective circumferential grooves 62 against the action of springs 72.

At this point, with arms 25, 26 and 27 maintained in a fixed angular position in relation to drum 6, operation of motor 22 (FIG.1) rotates drum 6 and, consequently, arms 25, 26 and 27 in relation to both tubular body 3 and tire 2. As arms 25, 26 and 27 rotate about axis 4 of tire 2, rollers 30, 31 and 32 stitch the inside of tire 2 with substantially no slippage between rollers 30, 31, 32 and tire 2. In fact, individual plates 59 and 60 of respective rollers 31 and 32 rotate about their axes at different surface speeds, in particular, at surface speeds equal to that of tire 2 at the point of contact with respective plates 59, 60.

At the end of the stitching operation, coupling 8 is rotated clockwise, and arms 25, 26 and 27 restored to the withdrawn idle position in the same way as previously described above, only in the reverse manner. In particular, rods 37 of arms 26 and 27 and, consequently, pairs of rollers 31 and 32 are returned to the starting position by means of torsion springs 56.

Unit or apparatus 1 as previously described therefore provides for stitching tire 2 from the inside, which not only provides for forming tire 2 against a perfectly circular surface 34. Mold 5 of unit 1, being a perfect negative reproduction of the final shape of tire 2, is capable of withstanding stitching pressure with substantially no distortion, but also enables any faulty or open splicing of the component layers of tire 2 to be smoothed out or stitched from the inside.

Figure 15:
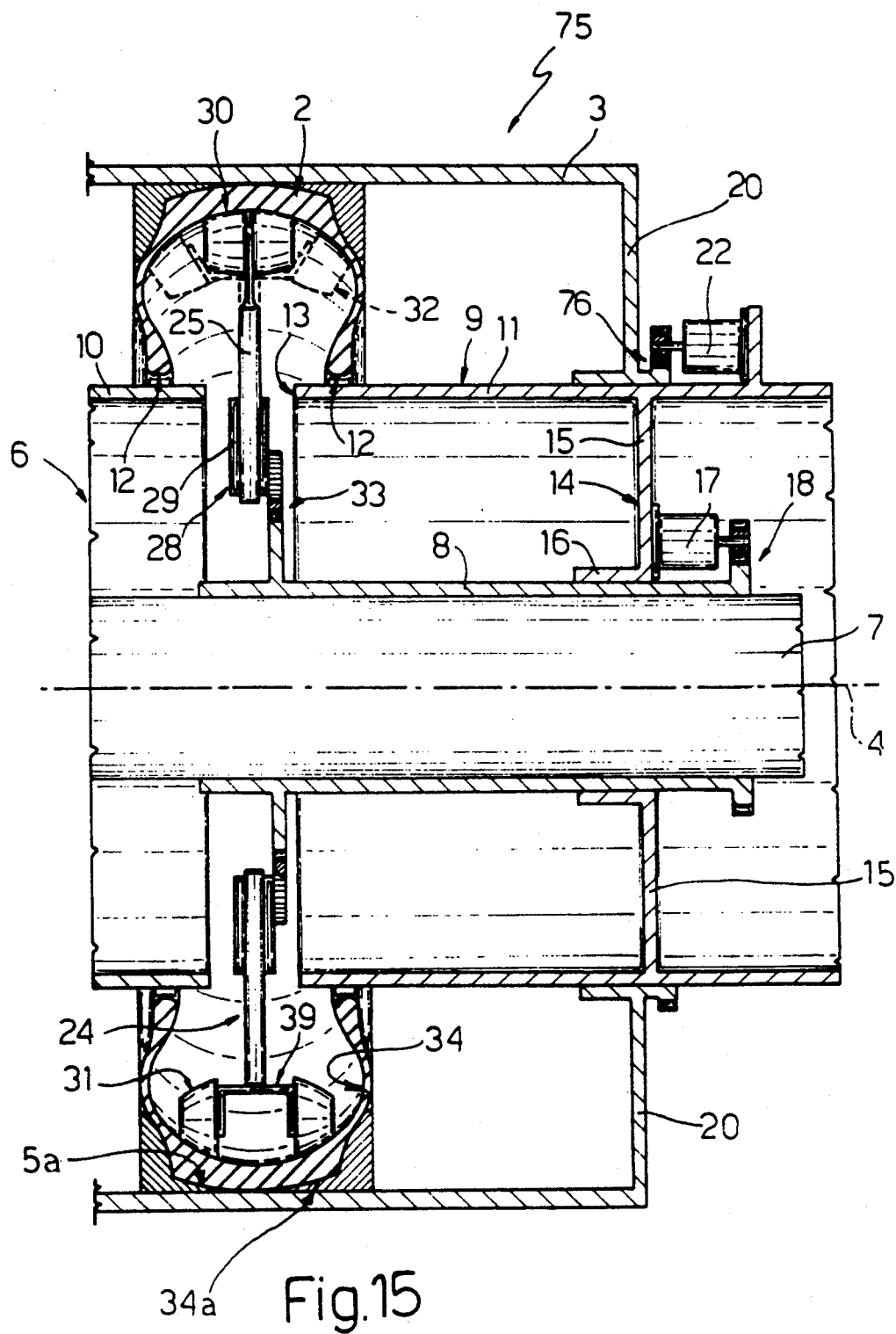
FIG.15 shows a schematic axial cross section of a second preferred embodiment of a stitching unit in accordance with the present invention.

The FIG. 15 embodiment relates to a stitching unit 75 similar to unit 1, except that, instead of being movable, drum 6 is angularly fixed; and tubular body 3 is connected for rotation to drum 6 by means of frame 19, and driven by motor 22 supported on tubular body 9 and having its output shaft connected to tubular body 3 via a pinion-ring gear joint 76.

In use, displacement of arms 25, 26 and 27 from the withdrawn idle to the extracted operating positions and vice versa is the same as for unit 1 in FIG.1. In this case, however, operation of motor 22 rotates body 3 in relation to drum 6 and, consequently, tire 2 about axis 4, while arms 25, 26 and 27 remain stationary together with drum 6.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A method of stitching a multilayer product of green elastomeric material including the steps of:
   providing a stitching mold having a hollow annular body and a concave inner surface;
   placing the multilayer product into the hollow annular body with a convex surface of said multilayer product being in contact with the concave inner surface of said stitching mold body;
   providing a tubular control body extending coaxially through said stitching mold, with said control body being formed with a circumferential opening;
   moving stitching elements through the circumferential opening of the tubular body from an idle position to an operating position wherein said stitching elements contact at a given pressure against a concave inner surface of the multilayer product to force the convex surface of said product into contact with the concave inner surface of the stitching mold; and
   producing relative motion between said stitching elements and said multilayer product to cause said stitching elements to stitch said multilayer product.

2. A method as claimed in claim 1 wherein said relative motion is achieved by maintaining said multilayer product stationary, and by rotating said stitching elements about an axis of rotation of said multilayer product.

3. A method as claimed in claim 1 wherein said relative motion is achieved by maintaining said stitching elements stationary, and by rotating said multilayer product about its rotational axis.

4. A method as claimed in claim 1 wherein said multilayer product is stitched against said concave inner surface of said stitching mold by means of a number of roller elements forming part of said stitching elements and each traveling along at least respective annular portions of said concave inner surface of the multilayer product.

5. A method as claimed in claim 4 wherein each of said annular portions overlaps each adjacent annular portion.

6. A method as claimed in claim 1 wherein said multilayer product is a finished green tire; wherein said concave inner surface of the multilayer product is an inner surface of said tire; and wherein said stitching elements when moving into the operating position and contacting said inner surface of said tire commence from the idle position wherein the distance between said stitching elements and an axis of said tire is less than the inside radius of said tire.

7. A device for stitching an annular multilayer product of green elastomeric material having a concave inner surface negatively matching an outer convex surface, including a stitching mold having a hollow annular body and stitching means housed inside a concave inner surface of said stitching mold for moving to and from an operating position and contacting the concave inner surface of said multilayer product, said stitching means comprising an internal control device and a number of stitching elements extending outwardly from and connected to said control device, said control device including a tubular body extending coaxially through said stitching mold and having a circumferential opening through which said stitching elements are adapted to move between a first idle position, wherein the stitching elements are housed inside said tubular body, and a second operating position wherein said stitching elements extend through said circumferential opening to contact at a given pressure said concave inner surface of said multilayer product; and actuating means for producing relative motion of said stitching means and said multilayer product, so as to cause said stitching elements to press said multilayer product into contact with said inner concave surface of said stitching mold and stitch said multilayer product.

8. A device as claimed in claim 7 in which said stitching mold is fixed, and in which said actuating means includes means to rotate said stitching means in relation to said stitching mold and about an axis of rotation of said multilayer product.

9. A device as claimed in claim 7 in which said stitching means is fixed, and in which said actuating means includes means to rotate said multilayer product about said stitching means and about an axis of rotation of said multilayer product.

* * * * *